July 25, 1961 G. S. ELLITHORPE 2,993,968
CIRCUIT-BREAKER-SWITCH MECHANISM
Filed May 8, 1957 5 Sheets-Sheet 1

*INVENTOR:*
GILBERT S. ELLITHORPE
BY
ATT'YS

July 25, 1961 G. S. ELLITHORPE 2,993,968
CIRCUIT-BREAKER-SWITCH MECHANISM
Filed May 8, 1957 5 Sheets-Sheet 2

INVENTOR:
GILBERT S. ELLITHORPE
BY
ATT'YS

July 25, 1961

G. S. ELLITHORPE 2,993,968

CIRCUIT-BREAKER-SWITCH MECHANISM

Filed May 8, 1957

INVENTOR:
GILBERT S. ELLITHORPE
BY
Rummler + Snow
ATT'YS

*INVENTOR:*
GILBERT S. ELLITHORPE
BY
ATT'YS

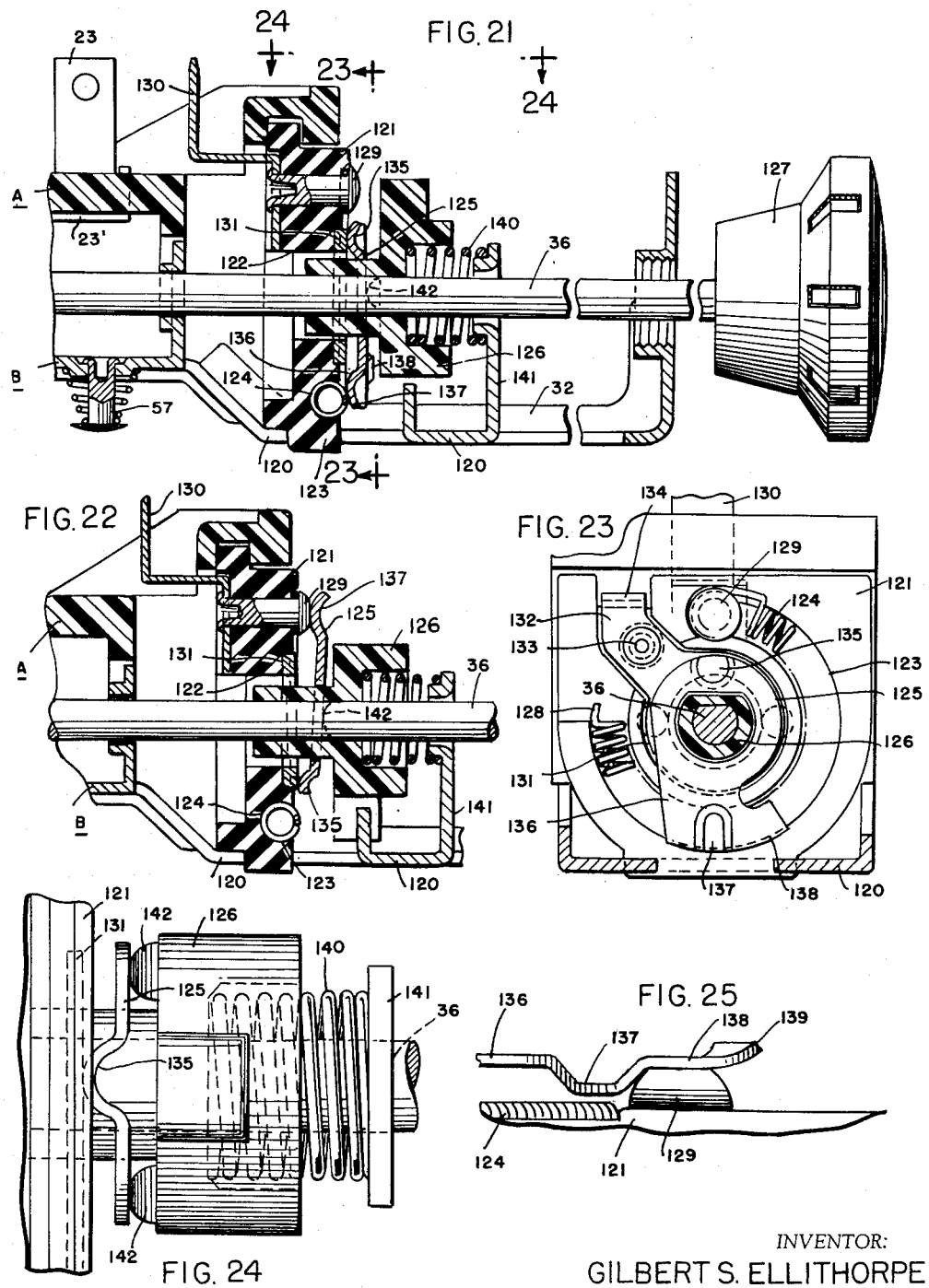

United States Patent Office 2,993,968
Patented July 25, 1961

2,993,968
CIRCUIT-BREAKER-SWITCH MECHANISM
Gilbert S. Ellithorpe, Waterman, Ill., assignor to Littelfuse, Incorporated, Des Plaines, Ill., a corporation of Illinois
Filed May 8, 1957, Ser. No. 657,965
13 Claims. (Cl. 200—113)

This invention relates to electrical-circuit control switch mechanims having an overload circuit-breaker and particularly to such devices adapted to require manual reset of the circuit-breaker when the circuit-breaker has been actuated by an overload condition. Further, this invention also relates to such devices adapted to energize a secondary circuit when an overload condition occurs.

The main objects of this invention are to provide an improved form of manually reset overload-circuit-breaking switch mechanism; to provide such a switch mechanism arranged for energizing a secondary circuit for temporary operation of an auxiliary utility during an overload condition; to provide an improved switch mechanism wherein the main circuits can be re-energized only by manually resetting the overload circuit-breaker when the main circuits are open by the switch being in the "off" position; to provide an improved switch mechanism of this kind which is adapted for use with circuits in either mobile or stationary structures; to provide an improved switch mechanism of this kind especially adapted for use in motor vehicles to activate an auxiliary set of lights when the main head-light circuit is rendered inoperative by the action of an overload circuit-breaker; to provide a manually reset circuit-breaker switch mechanism for switches of either the pull-push or the rotary type; to provide an improved manually reset circuit-breaker protected switch mechanism especially adapted for a spring-actuated, normally-closed type switch; to provide an improved counter-balanced mounting of the movable contact member in multiple contact switch mechanisms whereby equal contact pressure at all contact points is had; to provide an improved manually reset circuit-breaker protected switch mechanism which is simple and compact in construction, economical to manufacture, and efficient and durable in use; to provide an improved circuit arrangement for emergency operation of secondary vehicle lights when the primary lights are rendered inoperative by an overload in the primary lighting circuits; and to provide a multiple circuit switch having an improved dimmer control mechanism for regulation of one of the switch circuits.

Several specific embodiments of this invention are shown in the accompanying drawings in which:

FIGS. 9, 10 and 11 are diagrammatic views illustrating the operation of the circuit-breaker according to the principles of the present invention, FIG. 9 showing the normal circuit closing position, FIG. 10 showing the circuit-breaker when tripped by an overload, and FIG. 11 showing the open-switch reset position of the circuit-breaker;

FIG. 21 is a fragmentary view in sectional elevation, on the same plane as FIG. 2, showing the forward end of the switch mechanism shown in FIGS. 1 and 2 and illustrating the dimmer control means for the instrument light circuit of the said switch;

FIG. 22 is a view similar to FIG. 21 but showing only a portion thereof to illustrate the "full-on" position of the dimmer contactor;

FIG. 23 is a front elevational view of the same as taken on line 23—23 of FIG. 21;

FIG. 24 is an enlarged plan view detail of the dimmer circuit contactor mechanism as taken on line 24—24 of FIG. 21; and FIG. 25 is an enlarged fragmentary detail view showing the relation of the contactor and resistance coil at the "full-on" position of the contactor as in FIG. 22.

The essential concept of this invention involves a switch mechanism including a normally-closed, thermally-actuated circuit-breaker which when opened by an overload condition can be reclosed only when the movable contact carrier member is at a full "off" or circuit-opening position.

As herein shown, a switch mechanism embodying the foregoing concept comprises a terminal block A secured to a base support B and between which is arranged a movable contact carrier C mounting terminal contactor means D, and a thermally-actuated circuit-breaker E, the latter of which once actuated by an overload can be reset to its normal functioning position only after a manual operation of the switch mechanism, in the present instance the contact carrier, to its retracted or circuit-opening position.

The terminal block A varies in form depending upon the type of switch in which this improved circuit-breaker mechanism is incorporated. The drawings show the use of such mechanism with three different types of switches: a pull-push type, a normally-closed-circuit yieldingly retractable push-to-open type, and a rotary type.

Regardless of its form, the terminal block A is shaped from a suitable dielectric material so that all of the hereinafter-mentioned terminals and contacts are insulated one from another. The block A for each of these forms is appropriately recessed so that together with the base support B a housing is provided for the movable contact carrier C.

Figure 3:
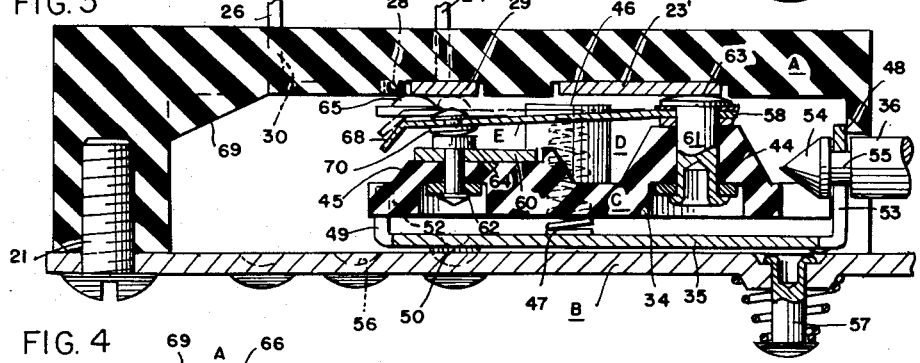
FIG. 3 is a similar view but showing the switch mechanism in its "on" or extended position.
Figure 4:
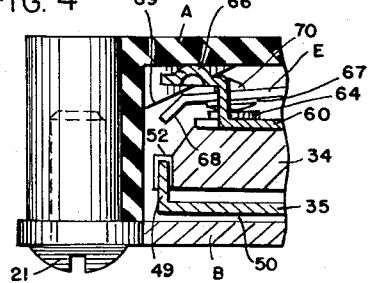
FIG. 4 is a fragmentary sectional detail taken on the plane of the line 4—4 of FIG. 1.
Figure 6:
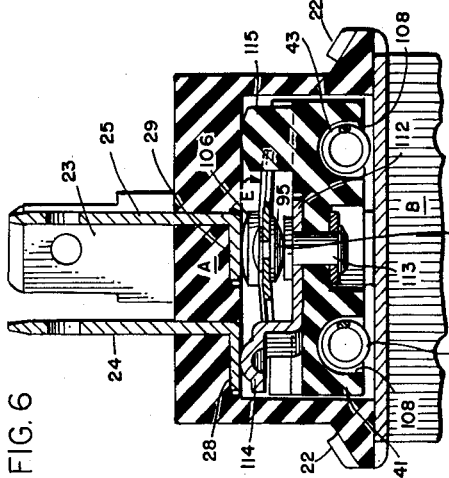
FIG. 6 is a transverse, sectional elevation taken on the plane of the line 6—6 of FIG. 5.
Figure 5:
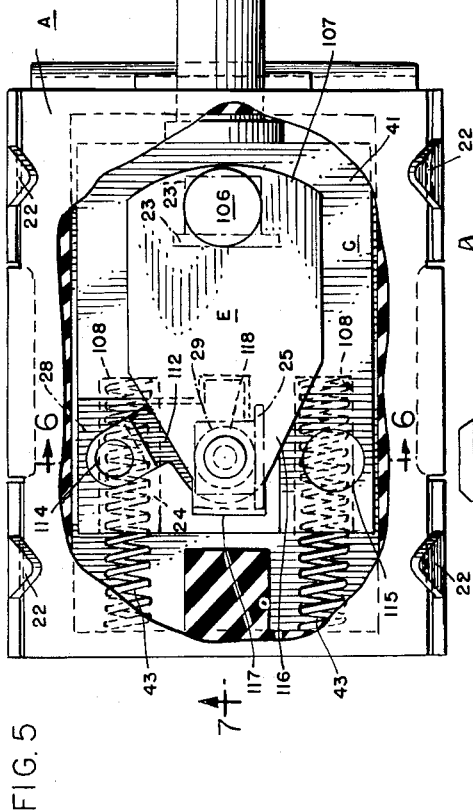
FIG. 5 is a plan view of a spring-actuated, normally-closed switch mechanism equipped with my improved manually reset circuit-breaker means and including my improved emergency circuit arrangement; the housing being partly broken away to more clearly show the internal parts.

In the switch adaptation of FIGS. 1-8 this terminal block A is of rectangular form and at points around its perimeter is detachably connected to the base support B by screws 21 (FIGS. 1-4), or bent-over lugs 22 on the base support B (FIGS. 5 and 6).

The terminal block A, for any of the hereinbefore-mentioned switch types, mounts at least a battery terminal 23, a main-circuit terminal 24, and a secondary-circuit terminal 25. For switch mechanism of the type shown in FIGS. 5-8, for use in stationary structures, such as house, factory, office, institutions, and the like, no other terminals may be needed. However, for switches of the types shown in FIGS. 1-4 and 12-14, for use on mobile structures, such as motor vehicles, other terminals will be required; e.g. terminal 26 for parking lights and terminals 27 and 27' for tail and instrument-light circuits respectively.

Where a switch mechanism of this kind is used in a motor-vehicle lighting system, obviously, the main circuit terminal 24 is for the head-light circuit and the secondary-circuit terminal 25 is for an auxiliary set of lights on the front, or on the front and rear, of the vehicle. Such auxiliary lights may be separate lights, as set forth in my U.S. Patent #2,692,309, or the directional signal lights of the vehicle in a manner as set forth in copending application Serial No. 414,975, filed March 9, 1954. Such a full set of terminals 23-27 are shown in dotted outline in FIG. 1 and in full outline in FIG. 12.

Figure 12:
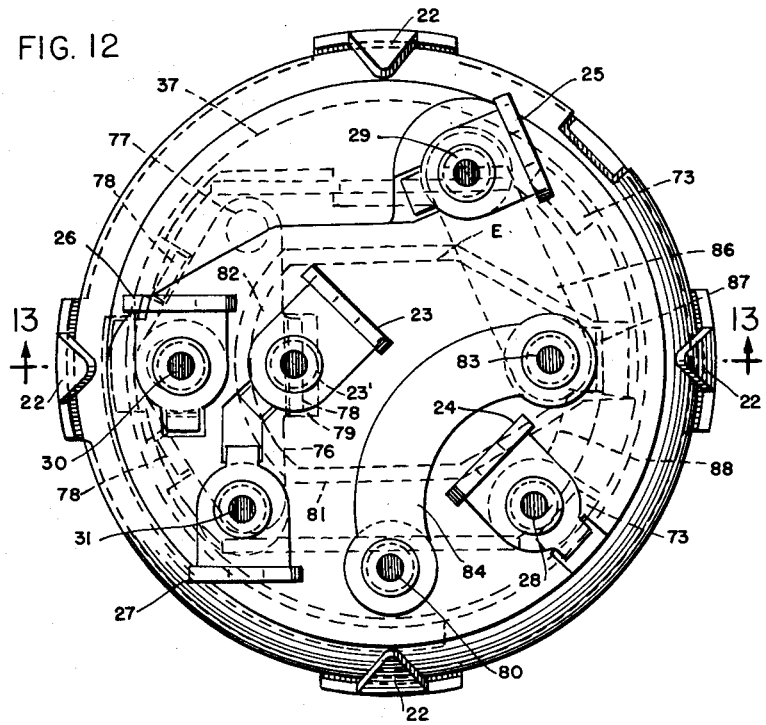
FIG. 12 is a plan view of an improved switch mechanism constructed in accordance with this invention as applied to a motor-vehicle, light-switch of the rotary type.
Figure 13:
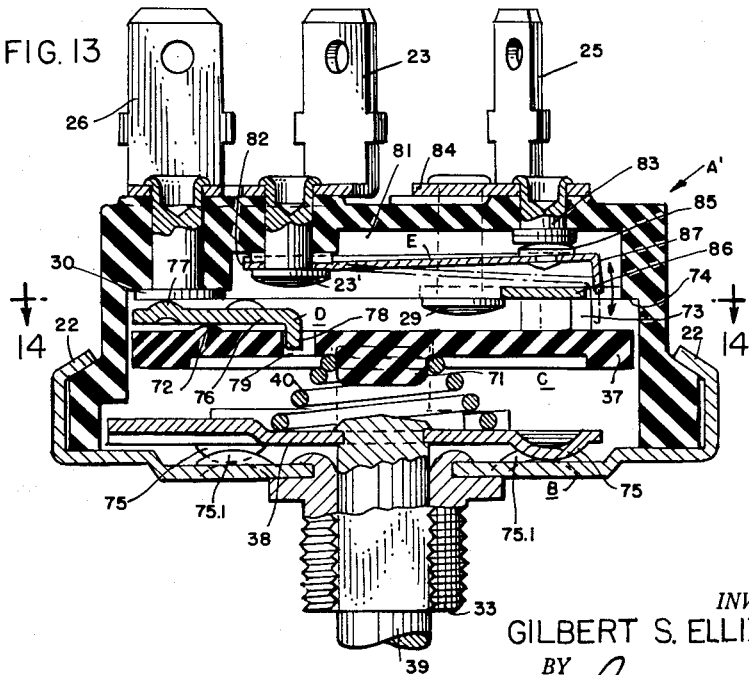
FIG. 13 is a vertical, sectional, elevation of the same as viewed from the plane of the line 13—13 of FIG. 12.

All of the terminals, mounted on the terminal block A, would be secured suitably in place in a known manner by their inner bent-over ends as seen in FIGS. 2, 3, 6, 7, and 8, or by studs or rivets as is clearly shown in FIGS. 12 and 13. The bent-over inner ends of the terminals and the heads of the rivets constitute the internal terminal-contacts which are selectively engaged by the hereinafter-described contactor means D on the carrier C, to bridge the battery terminal 23 with one or another of the other light-circuit terminals, as will be pointed out presently. Thus the inner ends 23', 28, 29, 30 and 31, of the respective terminals 23, 24, 25, 26 and 27—27' comprise the fixed terminal block contacts.

As is well understood, for motor vehicle switches of the hereinbefore-mentioned types, certain of the terminals are connected together by common contact means or by bus-bars so that certain circuits will be bridged to the battery for two different positions of the contact carrier C. Thus the terminals 27—27' have a common contact portion 31, as in FIG. 1 and bus-bars are employed in the rotary switch of FIGS. 12 and 13.

Figure 7:
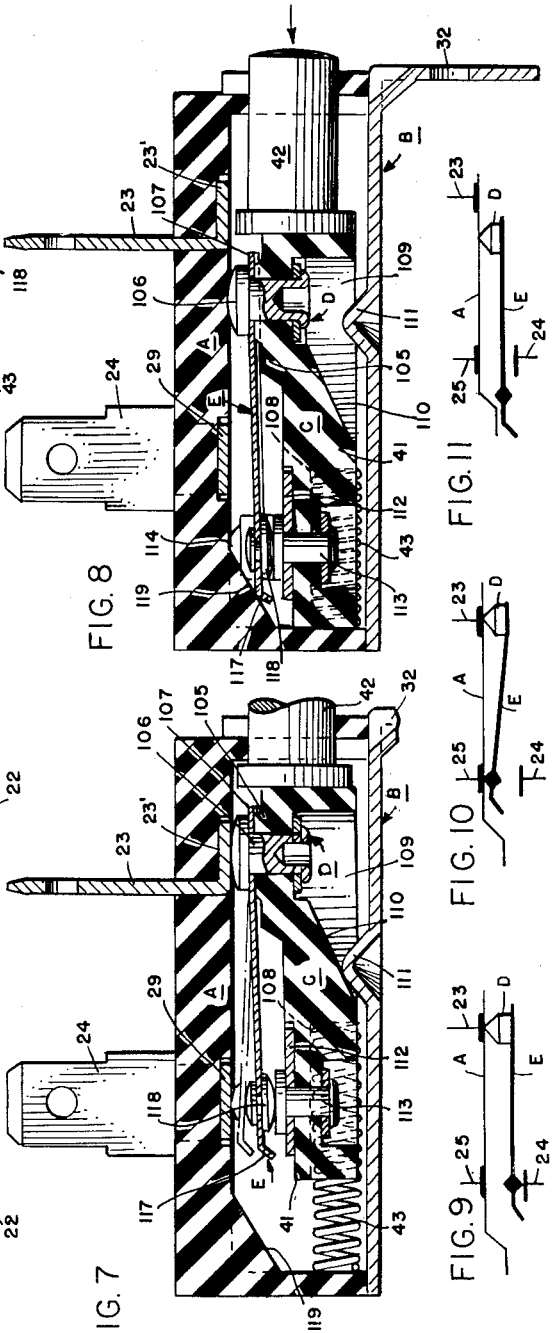
FIG. 7 is a longitudinal, sectional elevation of the same taken on the plane of the line 7—7 of FIG. 5, the overload actuated position of the circuit-breaker being shown in dotted outline.

The base support B would be formed of a material suitable for anchoring to some other support—such as a motor-vehicle dash or a housing wall. Generally metal would be used for this purpose. The contour of the base support B would approximate that of the terminal block and would have a suitable formation which would permit attachment to the required support. Such an attachment formation might be a bracket 32, as shown in FIGS. 7 and 21, or a threaded nipple 33, as shown in FIG. 13. As previously noted, the base support B and the terminal block A would be secured rigidly together by suitable fasteners.

The contact carrier C will have its form and mounting determined by the type of switch mechanism wherewith this improved circuit breaker is employed. For motor-vehicle switch mechanisms of the push-pull type, the contact carrier C here is shown to comprise a contactor mounting 34, a reciprocable supporting element 35, and an actuating rod 36 (see FIGS. 1-4). For motor-vehicle switch mechanism of the rotary type, the contact carrier here is shown to comprise a contactor mounting 37, a supporting element 38, and an actuating rod 39, with a spring 40 interposed between the mounting 37 and element 38 to urge the latter toward the bottom or terminal board portion of an annular cup-shaped housing A' (FIG. 13). For switch mechanism used with circuits in stationary structures or with appliances, the contact carrier C comprises a contact mounting member 41 and an actuating rod or push button 42, and the carrier is mounted in a hollow terminal block "A," wherein the member or carrier 41 is normally held at its circuit-closing position by springs 43 (FIGS. 5-8).

Referring now in detail to the adaptation shown in FIGS. 1-4, the contactor carrier or mounting 34 has recessed protuberances 44, 45, 46 and 46' formed on its upper face. To two of these protuberances, 44 and 45, are secured the hereinafter-described parts of the terminal contactor means D. The pair of recessed protuberances 46 and 46', which are disposed at opposite side margins of the carrier, enclose contact-maintaining springs 47.

The carrier supporting element 35 is of flat rectangular shape with upwardly-disposed tongues 48 and 49 formed at the opposite ends and detent bosses 50 and 51 formed on the under face thereof. The tongues 49 are seated in laterally spaced recesses 52 (FIGS. 2 and 4) in the adjacent rear end of the carrier 34 whereas the tongue 48 projects across the forward end of the carrier and is formed with a conventional key-hole slot 53 to receive the tapered head 54 of the actuating rod 36 and permit seating of the top edge of the slot 53 in an annular groove 55 adjacent the head 54.

The springs 47, seated in the pair of recessed protuberances 46 and 46', hold the contact carrier 34 in floating upwardly urged relationship on the supporting element 35. This insures a constant and firm engagement of the contactor means D with the contact surface of the terminal block A, as the carrier assembly C is reciprocated within the terminal block A.

The detent boss 50, at the rear or inner end of the element 35, seats in one or the other of the longitudinally spaced depressions 56, formed in the opposed face of the base support B, so as to yieldingly locate the carrier 34 in selective ones of the three positions to which the carrier is designed to be set, i.e. an "off" position and two positions at which it completes circuits through bridging the circuit terminals by the contactor means D presently to be described. The bosses 51 at the forward end of the element 35 merely ride on the inner face of the base support B to reduce to a minimum frictional contact between these relatively reciprocating parts.

The actuating rod 36, as previously explained, has its inner, annularly-grooved end seated in the key-hole slot 53 in the tongue 48 of the supporting element 35. By the manual pull and push of the rod 36 the contact carrier C is shifted from one position to another relative to the terminal block contacts.

Figure 1:
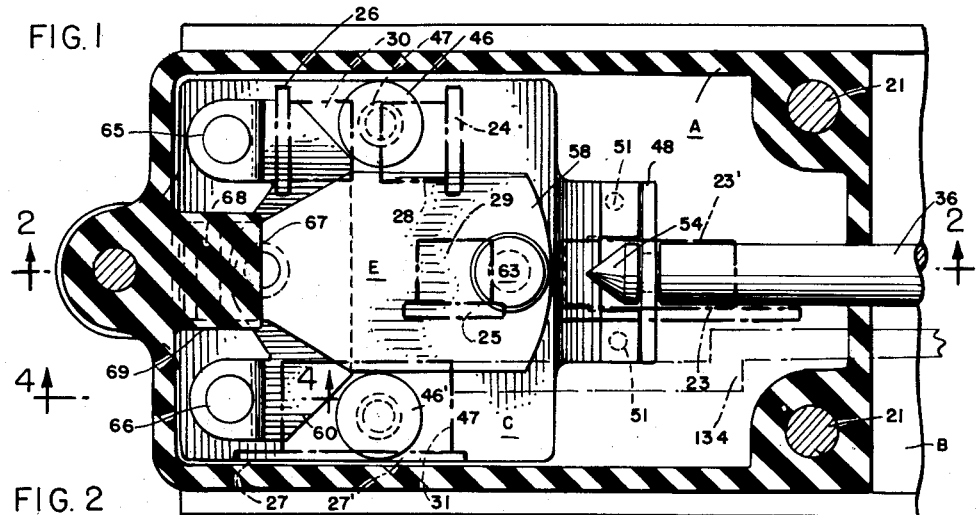
FIGURE 1 is a plan view of an improved motor-vehicle lighting switch mechanism of the pull-push type, constructed in accordance with this invention, the housing therefor being shown in section and the switch being shown in "off" or retracted position.
Figure 2:
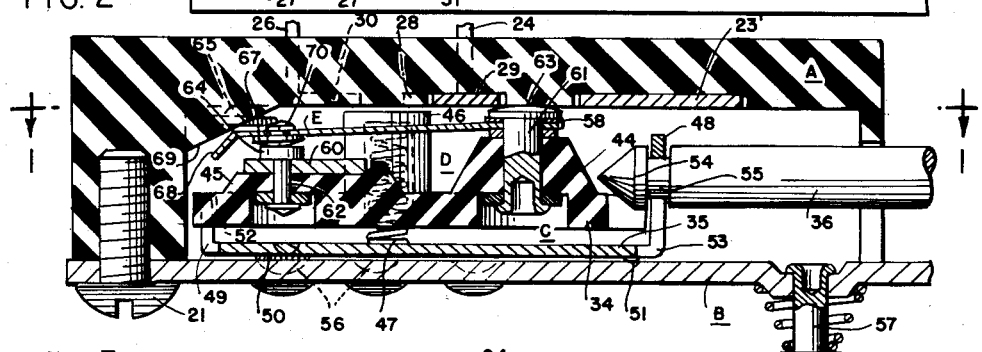
FIG. 2 is a longitudinal, sectional elevation of the same as viewed from the plane of the line 2—2 of FIG. 1, the line 1—1 of this figure being the plane whereon is taken the view shown in FIG. 1.

To operatively attach the rod 36 to the element 35 it is only necessary to push the tapered head 54 into the key-hole slot 53. This will cause a camming elevation of the element 35 against the action of the springs 47 sufficiently to permit the tongue 48 to pass the head 54 and become seated in the annular groove 55, as shown in FIGS. 1-3. When it is necessary to detach the actuator rod 36 from the supporting element 35, it is only necessary to position the element 35 to its forward-most position, as shown in FIG. 3. Thereupon an upward pushing of the spring-returned button 57 will lift the forward end of the element 35 against the action of the springs 47 sufficiently to raise the top edge of the openings 53 out of the groove 55 and permit the head 54 to be withdrawn from the tongue 48.

The contactor assembly D, for the pull-push type of switch mechanism shown in FIGS. 1–4, comprises the circuit-breaker E, and a plate 60 respectively secured on the upper faces of the protuberances 44 and 45 by rivets 61 and 62, the upper ends of which rivets constitute contacts 63 and 64.

As most clearly shown in FIG. 1, the plate 60 extends laterally outward on opposite sides of the protuberance 45 and is formed with forwardly- and upwardly-disposed arms having contact buttons 65 and 66 (FIGS. 1–4) provided by embossments formed in the ends of the arms. The contact buttons 65 and 66 of plate 60 are yieldingly pressed against the opposed inner face of the terminal block A by the coiled springs 47, acting between the carrier 34 and support element 35, to insure firm engagement with the contact ends 28, 30 and 31 of the respective terminals on the block A when the element 35 is shifted to an operative circuit closing position relative to the block A. Likewise, the rivet head contact 63 is held in firm engagement with the block contact 23' and since the springs 47 are between the contacts 63, 65 and 66 the carrier 34 provides a self-adjusting and balanced three point engagement with the terminal block A.

The circuit-breaker E, for the pull-push type of switch adaptation shown in FIGS. 1–4, is in the form of a conventional, thermally-actuated, bi-metal strip of the snap-action type. Its fixed end 58 is secured between a pair of washers on the contact rivet 61, beneath the rivet head 63, with the opposite free portion converging to a tongue 67 the extreme end of which is bent to provide an angulated camming finger 68. Inwardly adjacent the cam end 68 of the breaker blade E is a contact button 70 positioned for engagement with the contact 64. The contact button, as shown, is in the form of a rivet with its ends projecting from each face of the blade so that the upper end of the rivet will engage the terminal end 29 when the blade is thermally actuated as will be hereafter described. This breaker blade is so formed that once it is thermally actuated to retract the contact button 70 from engagement with the contact 64, the circuit-breaker remains in that retracted position until the blade is mechanically reset to its normal position engaging the contact 64. In the form of switch shown in FIGS. 1 to 4 the blade E is mechanically reset by shifting the carrier 34 from its operative position shown in FIG. 3 to its inoperative or "off" position shown in FIGS. 1, 2 and 4. When the carrier 34 is so shifted, the cam end 68 of the circuit-breaker E comes into contact with an inwardly inclined cam surface 69 formed on the inner, rearward end of the terminal block A. Whereupon the circuit-breaker E is depressed sufficiently to snap it back to its normal position and restore engagement of the contact button 70 with the contact 64 as shown in the detail of FIG. 4.

Figure 14:
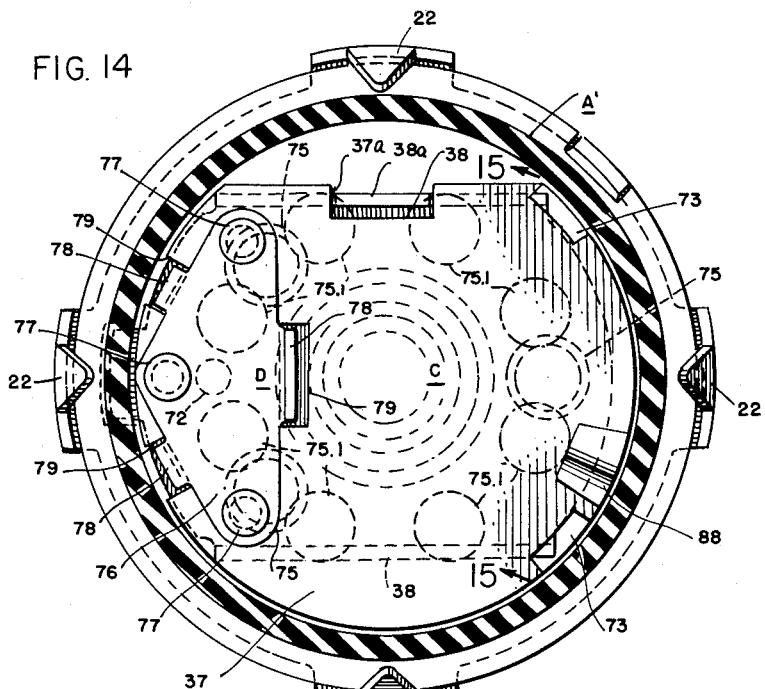
FIG. 14 is a sectional plan view of this same switch mechanism taken on the plane of the line 14—14 of FIG. 13.

Referring now in detail to the adaptation of this invention shown in FIGS. 12 to 18, the contactor mounting 37 is in the form of a rotatable dielectric disk with a central hub 71 which is embracingly gripped by one end convolution of the coiled spring 40. On its upper face, slightly inward from the periphery, is formed a hemispherical boss 72 (FIG. 13) and opposite thereto a pair of circumferentially-spaced, peripheral pillars or lugs 73 (FIGS. 13 and 14). The boss 72 provides for a universal pivotal tilting of the contactor means D presently to be described. The pillars 73 are of such a height that their contact with the under face of a marginal shoulder 74 the terminal block A' is substantially the same as and counterbalances engagement of the contactor means D with the same face of the block A'. This insures parallelism of the mounting 37 and an equal distribution of the pressure of the spring 40 in maintaining a constant and uniform engagement of the contact engaging bosses of the contactor means D with the several terminal contact rivet heads during the rotary reciprocation of the contactor mounting 37.

The supporting element 38 is a thin metal stamping of somewhat less than disk form (FIGS. 13 and 14) which along one edge has an upwardly-extending tongue 38a seated in a peripheral recess 37a on the contactor mounting 37 whereby the element 38 and mounting 37 are keyed together to rotate in unison. The element 38 also is bonded to the inner end of the actuator rod or shaft 39 (FIG. 13) whereby the element 38 and mounting 37 are rotated within the hollow body of the cup-like terminal block A'.

At angularly spaced points adjacent its perimeter the element 38 is formed with depressed bosses 75 which ride over and are seated between a series of opposed upset bosses 75.1 on the inner face of the base support B. The bosses 75.1 are arranged in pairs, as shown in FIG. 14, and the several pairs are located to coact with the drive element bosses 75 to properly position the contactor means D for selectively bridging the several circuit terminals on the block A', in the well-known manner.

The contactor means D, for this rotary type motor-vehicle switch, is a plate 76 of approximately triangular form—the corners where the angles normally would be having been rounded. Contact bosses 77 are upset adjacent the three rounded corners of the plate 76 and integral tongues 78 depend from each edge to seat in slots 79 in the contactor mounting 37. The plate 76 is positioned on the disk mounting 37 with the mounting boss 72 tiltably supporting the plate centrally of the bosses 77 and with the tongues 78 freely movable in the slots 79 in the mounting 37. The plate 76 being thus keyed to the contactor mounting disk 37 moves around the underface of the terminal block A to variously bridge the battery or power input contact 80 with the other circuit terminal contacts, in the well-known manner (FIGS. 16–18).

The circuit-breaker E, for this rotary type of switch mechanism, shown in FIGS. 12–14, is in the form of a thermally-actuated bi-metal strip mounted in a central recess 81 in the inner face of the terminal block A'. The fixed end 82 of the bi-metal strip is secured to the battery terminal rivet 23' (FIG. 13) and the free end extends radially therefrom for engagement with a contact rivet 83 which mounts a bus-bar 84 on the back side of the housing or terminal block A'. As shown in FIG. 12 the bus-bar 84 has its other end secured by the contact rivet 80 and thus connects the contact 80 with the battery by way of the circuit-breaker E. Also the free end of the bi-metal strip or circuit-breaker blade E is provided with a contact button 85 which projects from both faces of the blade. Normally the contact 85 is engaged with the contact rivet 83. However, upon thermal actuation of the circuit-breaker, as by an overload condition in one of the switch circuits, the contact 85 is brought into engagement with a contact plate 86, which is mounted on the inner face of the block A' by means of the rivet 29 for the emergency or secondary circuit terminal 25. The plate 86 is thus a lateral extension of the rivet 29 and when it is engaged by the circuit-breaker blade, upon overload actuation thereof, a direct connection between the battery terminal 23 and the secondary circuit terminal 25 is provided.

Figure 15:
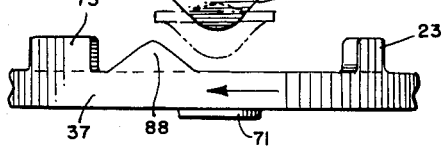
FIG. 15 is a fragmentary, elevational, detail of the rotating contact-carrier as viewed from the arcuate plane of the line 15—15 of FIG. 14.

The blade of the circuit-breaker E in this rotary switch, as in the case of the push-pull type of switch shown in FIGS. 1–4, is of the snap acting type which when actuated to the retracted position, shown in dotted outline in FIG. 13, remains in that position until physically reset or returned to the normal position and the arrangement of the switch mechanism is such that resetting of the circuit-breaker blade to its normal position can only occur when the switch is in its "off" or open circuit position. In the switch construction shown in FIGS. 12–15 this is accomplished by providing a cam finger 87 on the free end of the circuit-breaker blade, which finger overhangs and projects downwardly below the contact plate 86, and by providing a cam element 88 on the rotary contactor mounting 37 located and adapted to engage the cam finger 87 and force it, together with the blade, into the upper or normal position as the contactor mounting is rotated to its "off" position and after the contactor plate 76 has become wholly disengaged from the "hot" or input contact 80. This location and arrangement of the cam finger 87 and cam element 88 are shown in FIGS. 13–15 and it will be seen that both the cam finger and the cam element have complementary engaging surfaces so that a smooth and easy camming action is had. The parts are shown as with the switch in "off" position and in FIG. 15 the actuated position of the circuit-breaker is shown in dotted outline, hence it will be understood that since the circuit-breaker can only be actuated to its retracted position when the switch is in an "on" position the resetting of the blade occurs when the contactor mounting is rotated in the direction of the arrow in FIG. 15 to move the cam element 88 to the position shown.

Figure 16:
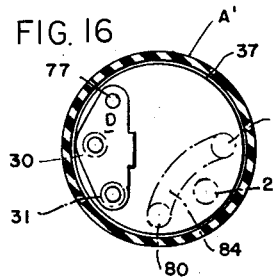
FIGS. 16, 17 and 18 are miniature plan views of three different positions of the shiftable contact carrier for a switch mechanism such as shown in FIGS. 12-14 illustrating the operating positions for controlling the typical circuits of a motor-vehicle lighting system.
Figure 17:
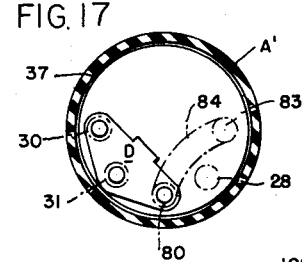
Figure 18:
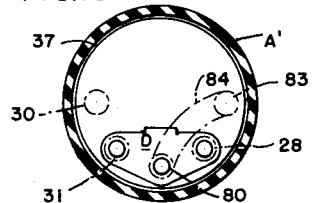

For the sake of clarity the three switching positions of a typical vehicle lighting circuit switch are shown in FIGS. 16–18, the figures being related to the rotary type of switch of FIGS. 12–14. The body of the terminal board or block A' and the shiftable contactor means D are shown in solid outline and the essential terminal board contacts are shown in dotted outline. In FIG. 16 the parts are shown in their relation with the switch in "off" position, contact 83 being energized by the circuit-breaker connection with the battery terminal, see FIG. 13, and connected to the "hot" contact 80 through the bus-bar 84. Contact 28 is for the head light circuit terminal 24, contact 30 is for the parking light terminal 26, and contact 31 is for the tail and instrument light circuit terminal 27. FIG. 17 shows the switch in its first circuit closing position wherein the contactor D bridges contacts 30, 31 and 80 to energize the parking and tail and instrument circuits. FIG. 18 shows the switch in its main or "full on" circuit closing positions wherein the contactor D bridges contacts 28, 31 and 80, energizing the tail and instrument circuits and the head light circuit, and opening the parking light circuit. In both "on" positions, FIGS. 17 and 18, all current is supplied through the circuit-breaker E to the contacts 83 and 80 and a dangerous overload in any circuit will actuate the circuit-breaker to open the battery connection to contact 83. When this occurs the secondary or emergency circuit through the terminal 25 is automatically closed and remains so until the switch is shifted to its full "off" position and the circuit-breaker is mechanically reset to its normal position.

It is a principal feature of this invention that the emergency or secondary circuit remains closed, when the circuit-breaker has become actuated by an overload, and does not repeatedly open and close as in the case of the circuit arrangements and switch means disclosed in my Patent No. 2,692,309 and in my pending application Serial No. 414,975. This means that the secondary or emergency circuit lights will burn continuously, when the switch devices of my present invention are employed, instead of flashing on and off as with the prior arrangements.

Figure 19:
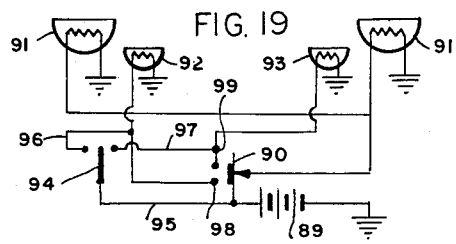
FIG. 19 is a diagrammatic view showing an improved motor-vehicle lighting circuit made practicable by the switch circuit-breaker mechanism of the present invention.

A typical vehicle head light circuit showing an adaptation of the improved mechanically reset circuit breaker arrangement for use of the vehicle direction signalling lights as emergency headway lights is schematically illustrated in FIG. 19. Only the bare essentials of the system are shown, namely, a battery or source of power 89; a circuit-breaker 90 of the mechanically reset type, shown in circuit closed relation between the battery and the circuits to head lights 91; a pair of direction signalling lights 92 and 93; a double-throw switch 94 for selectively energizing the signal lights 92 and 93 directly from the battery by way of leads 95, 96 and 97; and contacts 98 and 99 respectively connected into the signal light leads 96 and 97 and disposed for contact engagement with the circuit-breaker 90, when it is actuated by an overload in the head light circuits, and direct connection thereby with the battery 89.

In the circuit arrangement of FIG. 19 it will be seen that normally the headlights 91 and the signal lights 92—93 are independently controlled for their respective normal functions. Upon actuation of the circuit-breaker 90, however, as by an overload in the head light circuits, the breaker 90 will snap over to open the head light circuits and make direct connection from the battery 89 to the signal light contacts 98—99. Both signal lights will then be energized and will burn continuously until the circuit-breaker 90 is mechanically reset to its normal position. In this circuit it is necessary to have the two emergency signal light contacts 98—99 in order to preserve independent signalling operation of the signal lights 92—93 under normal operating conditions and for that reason the emergency contact side of the circuit-breaker must be capable of simultaneous dual contact engagement.

Figure 20:
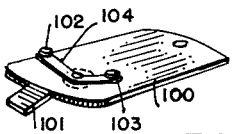
FIG. 20 is a perspective view showing one form of circuit-breaker blade particularly adapted for use with the improved lighting circuit of FIG. 19.

One such arrangement of the emergency contacts of a circuit-breaker blade is shown in FIG. 20 wherein the blade 100, having a reset camming finger or tongue 101, is provided with dual contacts 102 and 103 respectively mounted on the opposite ends of a spring bar 104 which in turn is transversely disposed and secured to the circuit-breaker blade adjacent its free end. The spring bar is curved to hold the contact ends in spaced relation to the blade 100 and is secured at its center to the blade so that the two arms will be of the same length and tension. With this arrangement positive engagement of the dual contacts with the two emergency circuit contacts is assured even though there might be some twist or warping of the circuit-breaker blade.

Referring now in detail to the switch mechanism adaptation shown in FIGS. 5–8, which is a normally closed switch for protection of appliance circuits, it will be seen that the contactor mounting 41 is somewhat similar to the mounting 34 of the adaptation shown in FIGS. 1–4. On its outer upper end the contactor mounting is formed with a protuberance 105 whereto is secured a contact rivet 106 extending through and fastening the fixed end 107 of the circuit-breaker E and forming a part of the contactor means D for this type switch mechanism. At the opposite end the mounting 41 has a pair of slots 108 formed therein which seat the springs 43 interposed between the adjacent wall of the terminal block and normally urging the mounting 41 to its forward circuit-closing or "on" position.

On the under face of the mounting 41 below the protuberance 105 and forwardly of the inner ends of the slots 108, is formed a recess 109 having an inclined rear wall providing a cam surface 110. This cam surface is positioned to engage a cam hump 111 upset from the opposed face of the supporting base B (FIG. 7). The engagement of the cam surface 110 and the hump 111 causes a lifting of the contactor mounting 41 and insures a firm engagement of the contactor means D, in this case the head of the rivet 106 and the contact button 114, with the opposed under face of the inner end 23' of the power input terminal 23 and of the inner end 28 of the terminal 24.

The actuator rod 42, for this FIGS. 5–8 adaptation, is suitably attached to the forward end of the contactor mounting 41. It is of a length somewhat greater than the maximum reciprocable movement of the mounting 41 in the terminal block A.

The contactor means D for this switch adaptation (FIGS. 5–8), comprises the contact rivet 106, and a contact plate 112 secured to the upper rear end of the mounting 41 by a contact rivet 113. The plate 112, somewhat like the contact plate 60 of the FIGS. 1–4 adaptation, extends outwardly on one side of its connection to the mounting 41 and is formed with a rearwardly and upwardly-disposed contact arm and button 114 (FIGS. 5 and 6). The contact button 114 yieldingly presses against the opposed inner face of the terminal block A by reason of the springs 43 and cams 110—111. This insures a firm engagement of the contact button 114 with the contact end 28 of the terminal 24, when the contactor mounting 41 is shifted forwardly by the springs 43.

A protuberance or pillar 115 (FIG. 6) is formed integral with the mounting 41 on the side opposite the contact button 114. This pillar is made to the same heighth as the contact button 114 and counterbalances the engagement of the contact button 114 against the under face of the block A so as to prevent tilting of the contactor mounting. Thus is insured a free and unbinding reciprocation of the contactor mounting 41 under pressure of the springs 43 and cams 110—111 or on manual actuation by means of the actuating rod 42.

Figure 8:
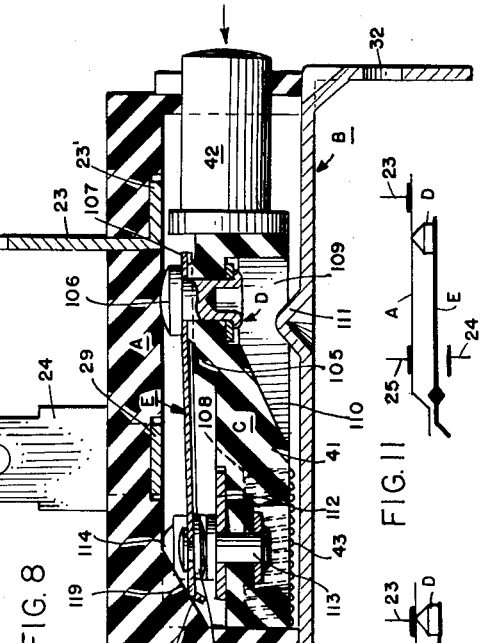
FIG. 8 is a view similar to FIG. 7 but showing the switch mechanism shifted to manually restore the circuit-breaker to its normal position subsequent to overload operation.

The circuit-breaker E for the FIGS. 5–8 adaptation, quite like the circuit-breaker for the FIGS. 1–4 adaptation, is in the form of a thermally-actuated, bi-metal blade or strip. Its fixed end 107 is secured to the contact rivet 106 with the free portion converging to a tongue 116, the extreme end of which is bent to provide an angulated cam finger 117 (FIGS. 7 and 8). Inwardly adjacent the cam end 117 of the blade is a contact button 118 which projects from both blade faces and is positioned for engagement with the contact rivet 113 for the plate 112 or the end 29 of the terminal 25 (FIG. 6).

As with the other hereinbefore described circuit-breakers E, this one is so formed that once it is thermally actuated to retract the contact button 118 from the contact rivet 113 (see FIG. 7) the circuit-breaker remains retracted and in contact with end 29 of secondary circuit terminal 25 until the blade is mechanically reset to its normal position.

As in the other switch arrangements herein disclosed, resetting of the circuit-breaker blade to its normal position can be accomplished only when the contactor mounting 41 is shifted, by pressure on the actuator rod 42 and against the action of the springs 43, to its "off" position wherein all circuits are open. When the mounting 41 is so shifted, the cam end 117 comes into contact with an inclined cam surface 119 at the rear inner end of the terminal block A. Thereupon the circuit-breaker E is restored to normal engagement of the contact button 118 with the contact rivet 113 and upon release of the actuator 42 the contactor mounting is returned by the springs 43 to its normal circuit closing position.

The operation of any of these switch-mechanism adaptations is essentially the same whether the circuit-breaker is on the movable contact mounting or on the terminal block. The contact mounting or carrier C, when in its retracted or "off" position, results in all circuits leading from the terminal block A, being open. An opposite shifting of the contact carrier C, to its partially-extended or fully-extended "on" positions, results in one or another of the circuits from the terminal block A being closed. In such normal "on" positions all current passes through the circuit-breaker E.

If by reason of a "short," or some other condition, a circuit becomes overloaded, the consequent excessive heating of the circuit-breaker E causes it to be actuated to retract and open the circuit it was designed normally to maintain closed. Such a retraction of the circuit-breaker E instantly closes the secondary circuit, through another terminal on the terminal block A, to an auxiliary utility. The circuit-breaker E, being formed so that once thermally-retracted it remains so, now maintains a constant flow of current through the secondary circuit to the auxiliary utility. This energization of the secondary circuit continues until there is a mechanical resetting of the circuit-breaker to its normal position. This sequence of operations is illustrated by FIGS. 9–11 wherein FIG. 9 shows the normal closed-circuit relation of the parts, FIG. 10 shows the circuit-breaker in overload actuated position, and FIG. 11 shows the relative movement of parts A and D whereby the circuit-breaker is reset when the parts are in open-circuit relation.

Specifically with regard to the adaptation of FIGS. 1–4, when the actuator rod 36 is pulled outwardly its full distance the contactor mounting 34 is positioned to locate the contact rivet 61 in engagement with the end 23' of the battery terminal 23 and the contact 65 in engagement with the end 28 of the head-light circuit terminal 24 (FIG. 3). The circuit-breaker E, with its contact button 70 in engagement with the rivet 64 of the plate 60, completes the head-light circuit. (At intermediate positions of the contact carrier C other motor-vehicle circuits are completed in the well-known manner.)

If a "short" in the head-light circuit, or some other condition, should create an overload such as to overheat it, the circuit-breaker E would snap to retracted position, as shown in dotted outline in FIG. 3. Such retraction of the circuit-breaker E engages the contact button 70 with the end 29 of the terminal 25 thus closing the secondary circuit at substantially the same instant that the main head-light circuit is opened. This secondary circuit being connected to some auxiliary lights on the motor-vehicle, as referred to in my U.S. Patent #2,692,309, or the directional lights, as referred to in my pending U.S. patent application Serial No. 414,975, would permit the driver of the vehicle to continue his journey to a point of safety or to one where there could be an appropriate examination and repair of the faulty head-light circuit.

Once the cause of the circuit-breaker actuating-overload has been corrected, the circuit-breaker E may be restored to its normal position by merely pushing in the actuating rod 36. Such inward movement of the contactor mounting or carrier 34 brings the cam end 68 on the circuit-breaker E into engagement with the cam surface 69 on the terminal block A. Thereupon, the circuit-breaker E is mechanically depressed to restore engagement of the contact button 70 with the contact rivet 64. The switch is then ready for its normal functioning and may be operated in the usual manner to energize the desired circuits.

What has been just explained about the operation of the switch adaptation of FIGS. 1–4 is substantially the same for the other adaptations of FIGS. 5–8 and FIGS. 12–14, except that in the adaptation of FIGS. 12–14 the contact or mounting 37 is rotatively moved by the turning of the shaft 39. Exactly the same sequence of movements and conditions obtain as with the switch mechanism adaptation of FIGS. 1–4.

The FIGS. 12–14 adaptation has the additional feature of the contactor plate 76 being so balanced, by the boss 72 of the mounting 37, and the plane of rotation of the mounting 37 so stabilized, by the pillars 73 contacting the opposed shoulder 74 of the terminal block A, that the pressure of the spring 40 is evenly distributed to the pillars 73 and the plate 76. In fact, approximately one-third only of the total spring pressure is applied to the three contact bosses 77. Thus the resultant force of each contact boss 77 is only one-ninth of the total pressure of the spring 40 so that contact friction and wear are a minimum.

In the embodiment of my improved switch mechanism shown in FIGS. 21–25 there is added an improved variable resistance means for further control of the instrument light circuit from the terminal 27 and its contact 31 in the switch arrangement of FIGS. 1–4. In this case the variable resistance means is mounted on the forward extension 120 of the base support by which the switch is mounted on a suitable supporting means such as a vehicle dash-board, and functions as a dimmer for the instrument and dash-board lights.

In the form shown, the variable resistance means comprises a dielectric body or base 121, suitably mounted on the forward extension of main switch base, and having a central bore 122 concentric with the operating shaft 36. A circular channel 123 is formed in the forward face of the body 121 concentric with the bore 122 and a coiled resistance wire 124 is seated in this channel so as to project laterally therefrom in the forward direction for engagement by a rotatable contactor 125 mounted on and suitably keyed to the hub of a dielectric rotor 126 which in turn is keyed to the shaft 36 for rotation thereby. As before mentioned in connection with the structure shown in FIGS. 1–4, the shaft is both axially reciprocable and rotatable, hence the rotor 126 is slidably keyed to the shaft 36. The shaft 36 is operated by means of a hand knob 127.

As is usual with such devices, one end of the coil 124 is suitably secured to the dielectric body, as at 128, and the other end is secured to a terminal rivet 129 which also mounts a terminal 130 to which the lead to the instrument light circuit is connected. Power is supplied to the coil 124 by means of a contact ring 131, also concentrically mounted with respect to bore 122 on the forward face of the body 121, which contact ring has a feed arm 132, secured by a rivet 133 to the body 121, and connected with a feed bar or bus-bar 134 leading from the contact 31 (FIG. 1). In this case the terminal 27' is not used and the terminal 130 serves instead as a connection for the instrument light circuits. As shown the contactor 125 is an annular ring-like member having a marginal boss 135, which rides on the contact ring 131, and a lateral arm 136 which is formed at its end to provide a contact shoe 137 for engaging the resistance coil 124. Thus the contactor provides the circuit connection between the ring 131 and the coil 124 and the position of the shoe 137 along the coil determines the amount of dimming resistance in the instrument light circuit.

Ordinarily in dimmer devices of this kind the contactor shoe engages just the last one or two convolutions of the resistance coil, adjacent the terminal rivet end, when the instrument circuit is almost "full on" or bright, with the result that these last one or two coil turns must carry the full load and often burn out. To cure this difficulty and to provide an improved contactor mounting I have devised the following construction and arrangement for dimmer devices of the foregoing nature.

My first such improvement is to provide an angularly extending finger 138 on the contactor arm 136 which finger is disposed to lead the contact shoe 137 in the direction of the terminal rivet 129. This finger 138 has an upwardly turned free end 139 and is arranged so that when the contactor is turned to the "full on" or bright position the finger will engage and ride up onto the terminal rivet 129 while there are still 5 or 6 turns of resistance coil remaining between the shoe 137 and the rivet end of the coil. This causes the shoe 137 to be lifted out of contact with the coil, as shown in FIG. 25, and at the same time affords direct, low resistance connection between the contact ring 131 and the terminal rivet 129, well before the length of resistance wire in the circuit has been reduced to the point where burn-out is likely to occur.

In order to facilitate this action of the contactor at the full current position and at the same time assure proper engagement of the contactor with the contact ring 131 I have provided an improved pivot mounting for the contactor element 125 whereby it can freely rock as may be necessary, to maintain engagement with conductors at different levels. As shown in FIGS. 21–24 the rotor 126 is axially slidable on the operating shaft 36 and is keyed thereto by means of complementary longitudinal flat surfaces on the shaft and in the rotor bore, and the rotor is normally urged in the rearward direction, toward the base or block 121, by means of a coiled spring 140 which seats in a recess in the rotor and bears against a support member 141, struck up from the extension 120. An axially extending hub on the rotor 126 carries the contactor 125 and the latter is loosely keyed to the hub by complementary flats as shown in FIG. 23. Thus the rotor bears against and urges the contactor into engagement with the resistance coil 124 and the contact ring 131 as shown in FIG. 21.

The pivot means or fulcrum about which the contactor 125 rocks in its operation comprises a pair of embossments 142, disposed on the rear face of the rotor 126, one on each side of the hub thereof, which bear against the forward face of the contactor plate. In the form shown these embossments 142 are rounded projections aligned transversely of the rotor axis and on a line normal to a line between the contactor boss 135 and the shoe 137. Thus regardless of the difference in elevation between the conductor surfaces engaged by the contactor 125 it is free to rock about an axis normal to the contacting points and under the action of the spring 140 will always assume a proper contacting relation with the conductor surfaces. It is this fulcrummed or pivotal rocking mounting for the contactor 125 that makes practical the lifting of the contactor shoe 137, away from the resistance coil 124, upon engagement of the finger 138 with the terminal rivet 129 as shown in FIG. 25.

The main advantages of my present invention reside in the improved switch and circuit breaker construction whereby the circuit breaker, when once actuated by an overload, must be returned to its normal position mechanically and then only when the switch mechanism is in the "off" or open circuit position; and in the arrangement of parts whereby resetting of the circuit-breaker occurs automatically when the switch is manually operated to its full "off" position, thus rendering impossible any resetting of the circuit-breaker and simultaneous re-energization of the primary circuits while the overload condition exists.

Other advantages of my invention reside in the improved floating contactor mounting or carrier arrangement whereby uniform distribution of contact pressures on the terminal board contacts is had; in the improved floating contactor construction and mounting wherein the contactor itself makes multipoint engagement with the terminal board or block contacts and the contact pressures are at a minimum yet positive; and in the improved contactor mounting arrangement for the dimmer control circuit whereby the resistance means is mechanically cut out of the circuit at full current position.

Although several specific embodiments of my invention have been herein shown and described it will be understood that numerous details of the constructions shown may be altered or omitted without departing from the spirit of the invention as defined by the following claims.

I claim:
1. An electric switch mechanism comprising a terminal block member having a pair of spaced terminal contacts on one face, a carrier member movable over said one face of the terminal block member in a plane parallel therewith and having contact means arranged for engagement with said terminal contacts simultaneously at one position of said carrier, means for moving said carrier member in said plane to engage and disengage said contact means and said terminal contacts, a circuit breaker blade mounted on one of said members and movable in response to a predetermined current condition to interrupt a circuit, means for connecting said blade electrically in series with said terminal contacts when said contact means and terminal contacts are engaged, said blade being formed to move from a first position to a second position when actuated by said current condition and to remain in said second position until mechanically reset to the first position, and means operable for mechanically resetting said blade to said first position when said carrier member is moved away from its said one position to a position wherein said contact means and terminal contacts are disengaged.

2. An electric switch mechanism comprising a terminal block member having a pair of spaced terminal contacts on one face, a carrier member movable over said one face of the terminal block member in a plane parallel therewith and having contact means arranged for engagement with said terminal contacts simultaneously in one position of said carrier, means for moving said carrier member to engage and disengage said contact means and said terminal contacts slidably, a circuit breaker blade mounted on one of said members and movable in response to a predetermined current condition to interrupt a circuit, means for connecting said blade electrically in series with said terminal contacts when said contact means and terminal contacts are engaged, said blade being formed to move from a first position to a second position when actuated by said current condition and to remain in said second position until mechanically reset to the first position, and means for mechanically resetting said blade to the first position automatically upon movement of said carrier member away from its said one position to a position wherein said contact means and terminal contacts are disengaged.

3. An electric switch mechanism comprising a terminal block member having a pair of spaced terminal contacts on one face, a carrier member movable over said one face of the terminal block member in a plane parallel therewith and having contact means arranged for engagement with said terminal contacts simultaneously, means for moving said carrier member in said plane to engage and disengage said contact means and said terminal contacts slidably, a circuit breaker blade mounted on one of said members and movable in response to a predetermined current condition to interrupt a circuit, means for connecting said blade electrically in series with said terminal contacts when said contact means and terminal contacts are engaged, said blade being formed to move from a first position to a second position when actuated by said current condition and to remain in said second position until mechanically reset to the first position, and means on the other of said members and engageable with said blade when said blade is in said second position for resetting said blade to its first position during movement of said carrier member and after said contact means and terminal contacts are first disengaged.

4. An electric switch mechanism comprising a terminal block member having a pair of spaced terminal contacts on one face, a carrier member movable over said one face of the terminal block member in a plane parallel therewith and having contact means arranged for engagement with said terminal contacts simultaneously, means for moving said carrier member in said plane to engage and disengage said contact means and said terminal contacts, a circuit breaker blade mounted on one of said members and movable in response to a predetermined current condition to interrupt a circuit, means for connecting said blade electrically in series with said terminal contacts when said contact means and terminal contacts are engaged, said blade being formed to move from a first position to a second position when actuated by said current condition and to remain in said second position until mechanically reset to the first position, and cam means on the other of said members for engaging said blade when the blade is in said second position and resetting said blade to the said first position during movement of said carrier member in said plane.

5. An electric switch mechanism comprising a terminal block member having a pair of spaced terminal contacts on one face, a carrier member movable over said one face of the terminal block member in a plane parallel therewith and having contact means arranged for engagement with said terminal contacts simultaneously, means for moving said carrier member in said plane to engage and disengage said contact means and said terminal contacts, a circuit breaker blade mounted on one of said members and movable in response to a predetermined current condition to interrupt a circuit, means for connecting said blade electrically in series with said terminal contacts when said contact means and terminal contacts are engaged, said blade being formed to move from a first position to a second position when actuated by said current condition and to remain in said second position until mechanically reset to the first position, and cam means on the other of said members for engaging said blade when the blade is in said second position and resetting said blade to the said first position during movement of said carrier member in said plane, said cam means being positioned to engage said blade only after said contact means and terminal contacts have been disengaged.

6. An electric switch mechanism comprising a terminal block member having a pair of spaced terminal contacts on one face and respective terminals for said contacts on another face, one of said contacts being a power source terminal contact and the other being a primary circuit terminal contact, a carrier member movable over the said one face of the terminal block member in a plane substantially parallel therewith and having contactor means for engaging said terminal contacts simultaneously, means for moving said carrier member in said plane to engage and disengage said contactor means and said terminal contacts, a circuit breaker blade mounted on one of said members and movable in response to a predetermined current condition to interrupt a circuit, means for connecting said blade electrically in series with the said terminal contacts when said contactor means and terminal contacts are engaged, said blade being formed to move from a first position to a second position when actuated by said current condition and to remain in said second position until mechanically reset to the first position, a secondary circuit terminal and contact means therefor on said terminal block member, means for connecting said blade electrically in series with the power source terminal and the secondary circuit terminal contact means when said blade is actuated to said second position, and means operable for mechanically resetting said blade to its said first position when said carrier member is moved to a position at which said contactor means and the first mentioned terminal contacts are disengaged.

7. An electric switch mechanism comprising a terminal block having a pair of spaced terminal contacts on one face, a carrier member movable over said one face of the terminal block in a plane substantially parallel therewith and having contact means for engaging said terminal contacts simultaneously to complete a circuit therebetween, means for moving said carrier member in said plane to engage and disengage said contact means and terminal contacts, a circuit-breaker blade on said carrier member normally in series with said contact means when said contact means are engaged with said terminal contacts, said blade being movable in response to a predetermined current condition to interrupt the said circuit and being formed to remain in its actuated position until mechanically reset, and cam means on said terminal block for engaging said blade in its actuated position and resetting said blade to its normal position upon movement of said carrier in said plane to a position wherein said contact means and terminal contacts are disengaged.

8. An electric switch mechanism comprising a terminal block having a pair of spaced terminal contacts on one face, a carrier member movable over said one face of the terminal block in a plane substantially parallel therewith and having contact means for engaging said terminal contacts simultaneously to complete a circuit therebetween at one position of said carrier member, means for moving said carrier member in said plane to engage and disengage said contact means and terminal contacts, a circuit-breaker blade on said terminal block movable in response to a predetermined current condition to interrupt a circuit and formed to remain in its actuated position until mechanically reset, means for connecting said blade electrically in series with said terminal contacts when said contact means and terminal contacts are engaged, and cam means on said carrier member for engaging said blade in its actuated position and mechanically resetting said blade to its normal position when said carrier is moved in said plane to a position wherein said contact means and terminal contacts are disengaged.

9. An electric switch mechanism comprising a terminal block having a pair of spaced terminal contacts on one face, a carrier member movable over said one face in a plane substantially parallel therewith and having spaced contact means thereon arranged for respectively engaging said terminal contacts simultaneously at one position of said carrier member to complete a circuit therebetween, resilient means for normally urging said carrier member to said one position, a circuit-breaker blade on said carrier member normally in series with said contact means when said contact means are engaged with said terminal contacts, said blade being movable in response to a predetermined current condition to open a circuit between said contact means, said blade being formed to retain its circuit opening position until mechanically reset, means for moving said carrier member against said resilient means to disengage said contact means from said terminal contacts, and cam means on said terminal block for engaging and resetting said blade when said carrier member is moved to disengage said contact means from said terminal contacts.

10. An electric switch mechanism comprising, a base support, a recessed terminal block secured to the support, a power source terminal contact and main- and secondary-circuit terminal contacts on the inner face of said recessed block, a contact carrier mounted for longitudinal reciprocation on the base support within the recessed terminal block and between open circuit and closed circuit positions, spaced contacts on the carrier for engaging the power source and main-circuit terminal contacts when the carrier is shifted into its closed circuit position, a thermally-actuated circuit-breaker blade secured to the power source terminal contact engaging contact of the carrier and normally urged to engage the other carrier contact to complete the main circuit when the carrier is shifted into its closed circuit position, said blade being movable in response to a predetermined current condition to open a circuit, a contact on the circuit-breaker positioned to engage the secondary circuit terminal contact to close a secondary-circuit to said power source terminal contact when the circuit-breaker is thermally actuated to open the main circuit, said circuit-breaker blade being formed to retain an open circuit position once actuated thereto until mechanically reset, and coacting cam means on the terminal block and the circuit-breaker blade adapted to mechanically restore the circuit-breaker to its normal circuit closing position when the carrier is manually shifted to its circuit-opening position.

11. An electric switch mechanism comprising, a base support, a recessed terminal block secured to the support, a power source terminal and main- and secondary-circuit terminals secured to the terminal block with predeterminedly-spaced contacts exposed on the inner face thereof, a rotatably reciprocable contact carrier journaled on the base support within the recessed terminal block and shiftable between open and closed circuit positions, contactor means on the carrier for engaging the power source and main-circuit terminal contacts when the carrier is rotated to its closed circuit position, a thermally-actuated circuit-breaker blade secured to the power source terminal contact and normally in series with the main circuit terminal contact to complete the main circuit when the carrier is rotated to its closed circuit position, said blade being movable in response to a predetermined current condition to interrupt a circuit, a contact on the circuit-breaker blade positioned to engage the secondary-circuit terminal contact when the circuit-breaker is actuated to open the main circuit, said circuit-breaker blade being formed to maintain such actuated position once shifted thereto until mechanically reset to its normal position, and coacting cam means on the carrier and the circuit-breaker for restoring the circuit-breaker to its normal position when the carrier is manually rotated to its retracted open circuit position.

12. An electric switch mechanism comprising, a base support, a recessed terminal block secured to the support, a power source terminal and several circuit terminals secured to the block with predeterminedly- and angularly-spaced exposed terminal contacts on the inner face of the block, an operating shaft journaled on the base support, a plate fixed to rotate with the shaft within the recessed terminal block, a contactor carrier member spaced axially inward of the plate in opposition to the terminal contacts on the terminal block and connected to rotate with the plate, a coiled spring interposed between the plate and carrier and normally urging the carrier member toward the inner face of the terminal-block, a contactor plate on said carrier member having three triangularly-spaced contact bosses positioned to variously engage the opposed terminal contacts to selectively bridge the power source terminal and circuit terminals, a boss on said carrier member tiltably supporting the contactor plate at a point intermediate the contact bosses and eccentrically of the carrier rotation axis, and peripherally-spaced shoulders on the carrier member angularly spaced from the contactor plate and of a height approximating the space between the inner face of the carrier member and the parallel plane of the engagement of the contact plate bosses and the terminal contacts, the said shoulders contacting the opposed face of the terminal block on the plane of the engagement of the contactor plate and terminal contacts so as to equalize the force of said spring transmitted by the contactor plate bosses against the said terminal contacts.

13. An electric switch mechanism comprising a terminal block having a pair of spaced terminal contacts on one face, a carrier member movable over said one face of the terminal block in a plane parallel therewith and having contact means for engaging said terminal contacts simultaneously to complete a circuit therebetween, means for moving said carrier member in said plane to engage and disengage said contact means and terminal contacts, a circuit-breaker blade on said terminal block movable in response to a predetermined current condition to interrupt a circuit and formed to remain in its actuated position until mechanically reset, means for connecting said blade in series with said terminal contacts when said contact means and terminal contacts are engaged, a secondary circuit terminal contact on said terminal block and electrically insulated from the first mentioned terminal contacts, a contact on said circuit-breaker blade positioned to engage the secondary circuit terminal contact when said blade is in actuated position interrupting the series circuit between said first mentioned terminal contacts, and cam means on said carrier member for engaging said blade in its actuated position and resetting said blade to its normal position when said carrier is moved in said plane to a position wherein said contact means and terminal contacts are disengaged.

References Cited in the file of this patent

UNITED STATES PATENTS

| | | |
|---|---|---|
| 1,658,866 | Thordarson | Feb. 14, 1928 |
| 1,939,286 | Spencer | Dec. 12, 1933 |
| 2,193,268 | Catron et al. | Mar. 12, 1940 |
| 2,203,309 | Schmid | June 4, 1940 |
| 2,434,984 | Bolesky et al. | Jan. 27, 1948 |

(Other references on following page)

UNITED STATES PATENTS

| | | |
|---|---|---|
| 2,453,546 | Smith | Nov. 9, 1948 |
| 2,672,531 | Stevenson | Mar. 16, 1954 |
| 2,681,395 | Malone | June 15, 1954 |
| 2,681,397 | Schwartz et al. | June 15, 1954 |
| 2,692,309 | Ellithorpe | Oct. 19, 1954 |
| 2,696,538 | O'Neill | Dec. 7, 1954 |
| 2,717,944 | Daily et al. | Sept. 13, 1955 |
| 2,720,566 | Ringwald | Oct. 11, 1955 |
| 2,734,159 | Malone | Feb. 7, 1956 |
| 2,740,013 | Waters | Mar. 27, 1956 |
| 2,743,333 | Epstein | Apr. 24, 1956 |
| 2,747,053 | Locher | May 22, 1956 |